United States Patent [19]

Egawa et al.

[11] Patent Number: 4,985,723
[45] Date of Patent: Jan. 15, 1991

[54] PHOTOGRAPHIC CAMERA

[75] Inventors: Takeshi Egawa; Masaaki Nakai; Yasuo Nakanishi; Toshihiko Ishimura; Shinichi Nishimura; Sadafusa Tsuji; Kenji Ishibashi, all of Osaka, Japan

[73] Assignee: Minolta Camera Kabushiki Kaisha, Osaka, Japan

[21] Appl. No.: 352,191

[22] Filed: May 16, 1989

[30] Foreign Application Priority Data

May 16, 1988 [JP] Japan .................................. 63-119848
May 16, 1988 [JP] Japan .................................. 63-213192

[51] Int. Cl.⁵ .............................................. G03B 13/36
[52] U.S. Cl. ................................ 354/400; 354/195.1; 354/442; 354/443; 354/286
[58] Field of Search ..................... 354/400, 402, 195.1, 354/442, 443, 286

[56] References Cited

U.S. PATENT DOCUMENTS 4,534,621 8/1985 Miki et al. .
4,553,817 11/1985 Ando et al. .
4,564,265 1/1986 Miki .
4,609,274 9/1986 Iwashita et al. .................... 354/400
4,792,820 12/1988 Norita et al. ......................... 354/402
4,853,732 8/1989 Suzuki et al. ....................... 354/402

FOREIGN PATENT DOCUMENTS 59-140408 9/1984 Japan .

Primary Examiner—Russell E. Adams
Attorney, Agent, or Firm—Burns, Doane, Swecker & Mathis

[57] ABSTRACT

A camera has an exposure control unit and a focus control unit. The exposure control unit selectively provides a programmed exposure control mode, where an aperture value and a shutter speed value are automatically set based on a detection by a light metering sensor and an accordance with a preset program, and a manual exposure control mode where at least either of the aperture value and the shutter speed value is set manually. The focus control unit selectively provides an autofocus mode where a focusing is automatically effected based on a detection by a focus sensor and a manual focus mode where the focusing is effected manually. The invention is characterized by a feature which permits a forcible switchover of the focus control mode from the manual to the auto focus mode in response to a switchover of exposure control mode from the manual to the auto exposure mode.

9 Claims, 16 Drawing Sheets

PHOTOGRAPHIC CAMERA

BACKGROUND OF THE INVENTION

1. Field of the Invention

The present invention relates to a photographic camera having an exposure control unit and a focus control unit each providing a plurality of control modes and the ability to switch over between the control modes. More particularly, the exposure control unit provides a programmed exposure control mode where an aperture value and a shutter speed are automatically set in accordance with a detection result of a light metering sensor and with a predetermined program and a manual exposure control mode where at least either the aperture value and the shutter speed value is manually set. The focus control unit provides an autofocus mode where focusing is effected automatically based on a detection result of a focus detection sensor and a manual focus mode where a focusing is effected manually.

2. Description of the Related Arts

A commercially available photographic camera of the above-noted type permits a user to freely select the one mode from the exposure control modes and to freely select the one mode from the focus control modes by operating independent switches.

Further, in the manual exposure control mode, at least three exposure modes are available for the user: an aperture-priority mode where the exposure control unit, which is incorporated in the camera body, automatically sets a shutter speed with the user's presetting of an aperture value; a shutter-priority mode where the exposure control unit automatically sets an aperture value with the user's presetting of a shutter speed, and a full manual mode where both an aperture value and a shutter speed are freely set by the user himself. These manual exposure modes are useful for emphasizing the contrast of the photographic object, enlarging an in-focus range through utilization of the depth of field, or for freezing an action of a fast moving object such as in a sports photography. While experienced users may intentionally use these manual exposure setting modes in order to obtain a desired effect, these modes are rarely used by inexperienced users.

Similarly, the manual focus mode is apt to be used only by experienced users because of, e.g. the troublesomeness of the focusing operation.

Accordingly, this type of automatic camera permits switchovers in the exposure control mode and the focus control mode between the automatic mode and the manual mode so that an inexperienced user also may make full use of the camera. Naturally, such an inexperienced user tends to use the programmed exposure control mode for the exposure setting and the autofocus mode for the focus setting. However, if the user switches over to the manual exposure mode and to the manual focus mode when he wishes for a particular photographic mode and then wishes to reset the modes back to the programmed exposure control mode and to the autofocus mode after the particular photograph, he must usually operate two different switches for the mode resetting operations.

Moreover, if the cameral is of the lens type, the above-described exposure and focus control modes switchover operations entail further inconveniences to be described next.

As described above, such a camera permits selective use of various types of exchange lenses having different focal lengths, aperture values and so on. Some of such exchange lenses, e.g., a macro lens, require manual settings of aperture value and shutter speed for best results. Further, the user may want to manually set the camera for the other types of exchange lenses as well as to obtain some special effects described hereinbefore. Then, when the photography has taken place by such manual setting mode and the lenses are again exchanged for a next photography by the automatic modes, conventionally the user must operate the manual operational elements for the mode switchover operations.

Especially, if the photographs using the different lenses take place with a considerable time interval therebetween or if a different user uses the same camera in the next photography, the user will often forget or be uninformed of the modes being currently set at the manual modes. Then, since the program setting mode is easier and more commonly used in this type of camera, the user mistakenly takes it for granted that the camera is set at the program mode and just proceeds to take the photograph without doing focusing or shutter speed and aperture value setting operations. Naturally, this photograph will turn out unsatisfactory because of inapropriate focusing and/or exposure. That is, the user will waste the film and fail to capture the precious moment.

SUMMARY OF THE INVENTION

The first object of the present invention is to provide a photographic camera which permits a user to easily carry out a manual-to-automatic mode switchover operation of both of the exposure control mode and the focus control mode.

The second object of the invention is to construct the camera in such a way that the camera permits the user to reliably take a photograph in a predetermined mode while eliminating the possibility of inappropriate photography resulting from the user's forgetting to carry out the mode switchover operations after a lens exchange.

In order to accomplish the first object, a photographic camera related to the present invention comprises: focus condition detection means for detecting focus condition of a photographic lens relative to a photographic subject; exposure control means capable of selectively providing a plurality of exposure control modes; exposure mode selecting means for selecting a predetermined exposure control mode from the plurality of exposure control modes; focus control means for selectively providing an autofocus mode in which a focusing is effected automatically based on the focus condition detected by the focus condition detection means and a manual focus mode in which a focusing is effected manually; focus mode selecting means for switching over between the autofocus mode and the manual focus mode; and switching means for switching the focus control means from the manual focus mode to the autofocus mode in response to an exposure mode selecting operation by the exposure mode selecting means. With the above construction, because of the switching means which switches the focus control mode from the manual focus mode to the autofocus mode in response to an exposure mode selecting operation, even if both of the exposure control mode and the focus control mode are currently set at the manual modes, these modes together may be switched over respectively to the automatic, i.e. programmed exposure control mode and the autofocus control mode by one-step operation of a single operational element such as a switch.

In order to accomplish the second object, a photographic camera related to the present invention comprises: a camera body; a photographic lens detachably attached to the camera body; manual operating means for switching over the focus modes; lens-attachment detecting means for detecting an attachment of the photographic lens to the camera body; and forcible swithcing means for forcibly switching the focus mode to the autofocus mode in response to a lens attachment detection effected by the detecting means while overriding the manual operating means and for allowing thereafter a mode switchover by the manual operating means. With the above construction, after a lens exchange operation, the focus mode is automatically reset to the predetermined mode which is the autofocus mode in this case. Accordingly, the user need not check before each photograph whether the current mode is set to the predetermined mode or not after the lens exhange operation and may start the photography without losing time. Consequently, except for a special occasion where the user intentionally effect a mode switchover operation to, e.g., the other mode as may be needed in a special photography situation, he may concentrate on the photography operation itself without the fear of failure.

The foregoing and other objects, features and advantages of the invention will be apparent from the following more particualr description of a preferred embodiment of the invention, as illustrated in the accompanying drawings.

BRIEF DESCRIPTION OF THE DRAWINGS

Accompanying drawings illustrate one preferred embodiment of the present invention; in which.

DESCRIPTION OF THE PREFERRED EMBODIMENT

A preferred embodiment of the present invention will be particularly described hereinafter with reference to the accompanying drawings.

Figure 1:
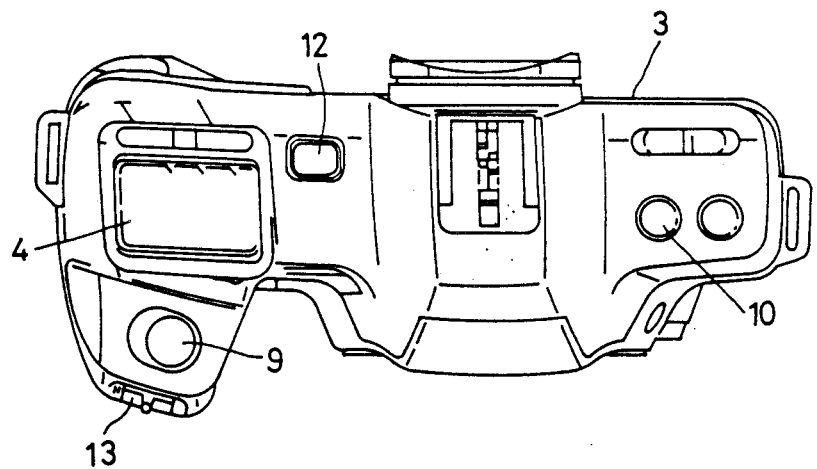
FIG. 1 is a plane view showing a camera body.
Figure 2:
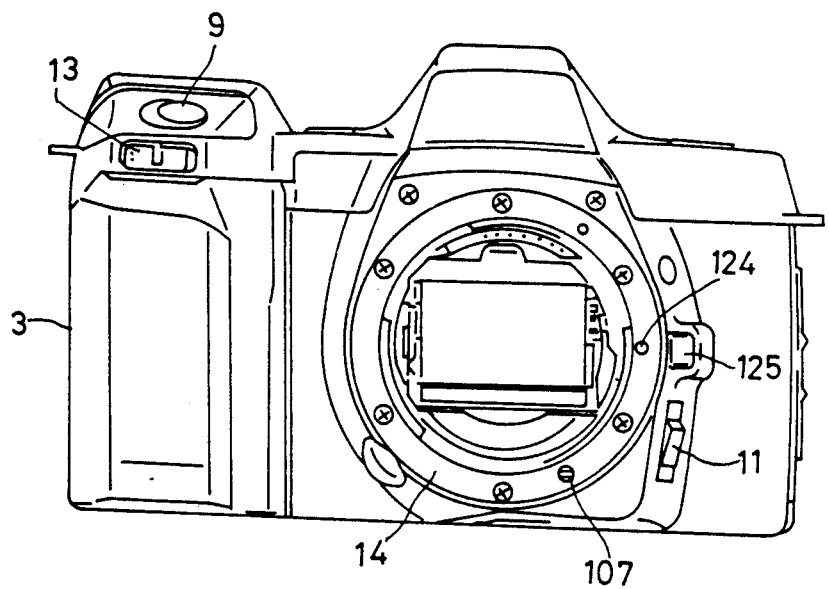
FIG. 2 is a front view showing the camera body.

FIGS. 1 and 2 are a plane view and a front view of a photographic camera without the objective lens, respectively. This camera incorporates a control device including an exposure control unit for selectively providing a programmed exposure control mode, an aperture-priority mode, a shutter-priority mode and a manual exposure control mode, a focus control unit for selectively providing an autofocus mode and a manual focus mode, and a forcible mode switchover unit for forcibly switching over the focus control means to the autofocus mode in response to a switchover of the exposure control unit to the programmed exposure control mode.

Figure 3:
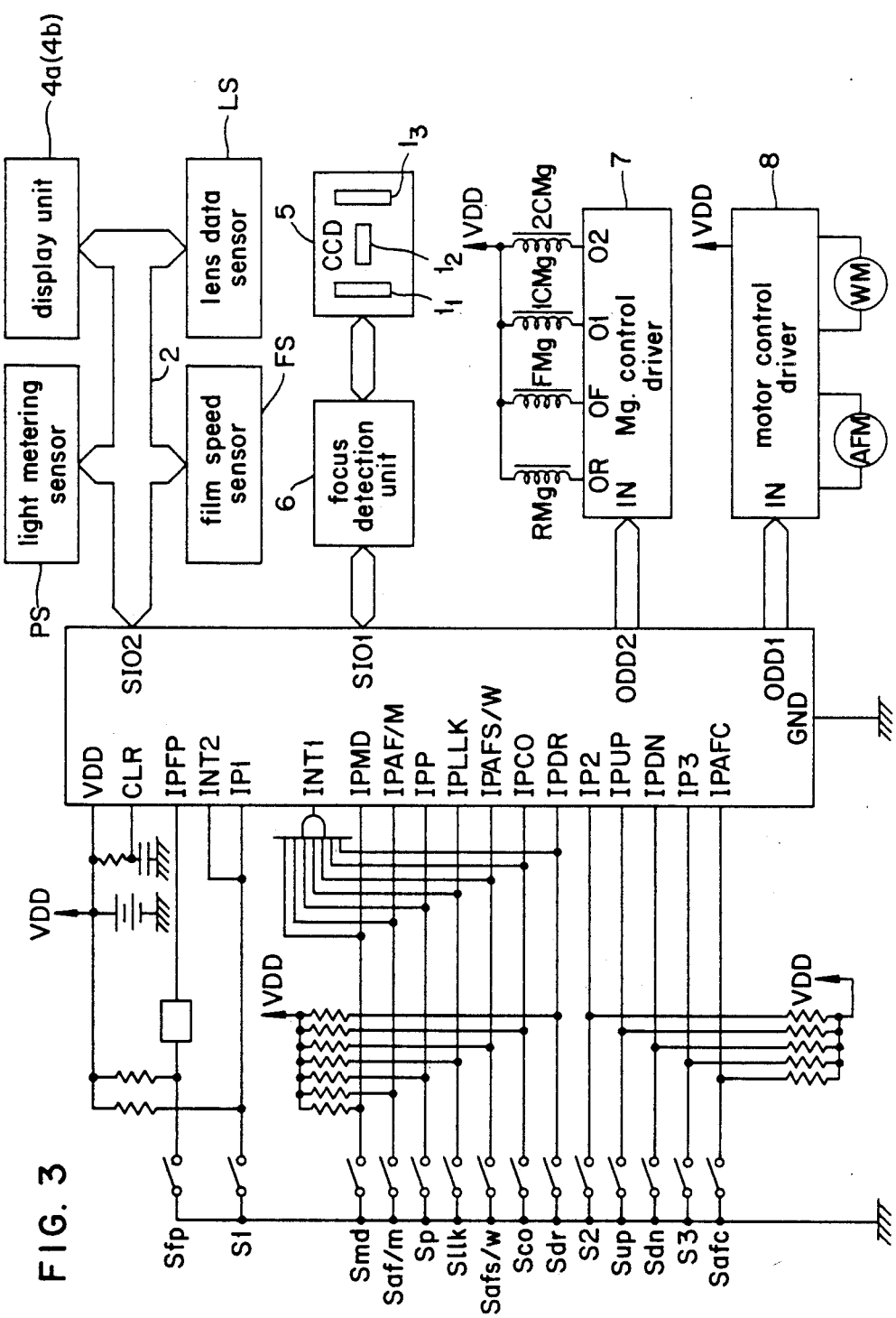
FIG. 3 is a block diagram of a circuit constituting the camera, FIGS. 4A and 4B respectively show a display panel on the camera body and a viewfinder display inside a viewfinder.

More particularly, as shown in FIG. 3, the control device includes a microprocessor 1. This microprocessor 1 receives, via a data bus 2, light metering data from a light metering sensor PS, film speed data from a film speed sensor FS and lens data from a lens data sensor LS and controls a focus detection unit 6 for detecting a focus condition based on data from a focus sensor 5 having three solid image pickup elements rows $I_1$ to $I_3$, a magnet driver 7 for driving a release magnet RMg, an aperture stop magnet FMg for stopping a closing motion of an aperture stop and a shutter-control magnet pair 1CMg and 2CMg for respectively driving a first curtain and a second curtain of a focal plane shutter, and a motor driver 8 for driving an autofocus motor AFM and a film windup motor WM and display units 4a and 4b which correspond to a display plane on the top of the camera body and a viewfinder display in the viewfinder. In addition, the microprocessor is connected with switches described next.

As shown in FIG. 3, the switches connected with the microprocessor 1 include a switch Sfp which mechanically turns ON/OFF in response to an operation of the aperture stop, a light metering switch S1 which turns ON with an operation of a shutter release button 9 to the first step (halfway), a mode switch Smd which turns ON/OFF in response to an operation of a mode select button 10, a focusing mode select switch Saf/m which is operated by a selector knob 11, a Pmode switch Sp for setting the programmed exposure control mode with an operation of a program set button 12, a lock switch S11k for detecting whether the lens is mounted on a camera body 3 in a locked state, a focus detection area select switch Saf s/w for selectively setting a focus detection area either to a spot area which corresponds to only the row $I_2$ of the focus sensor 5 or to a wide area which corresponds to the rows $I_1$ to $I_3$, an exposure adjustment switch Sco which is operated for an exposure adjustment, a drive mode select switch Sdr for selecting either of one-frame shot mode or continuous shot mode as a drive mode, a release swtich S2 which turns ON when the shutter release button 9 is pressed down to the second step, a switch pair Sup and Sdn which are selectively operated with a slide operation on an UP/DOWN knob 13, a switch S3 which is mechanically turned ON in response to one-frame film advance and a swtich Safc which turns OFF when a coupler 107 held capable of projecting from and retracting into a flanged surface 14 of the lens mount for transmitting focusing engine power to the lens is connected with a focusing system of the lens unit. Of these switches, the mode select switch Smd, detection area select switch Saf S/w, program setting switch Sp, exposure adjusting switch Sco and the drive mode select switch Sdr are manually operated to interrupt the control operation of the microprocessor 1 for effecting predetermined functions.

Next, display units will be described with reference to FIGS. 4A and 4B. As shown, the display panel 4a has three upper, middle and lower display areas. In the upper area, a section d21 numerically displays a film speed value and a shutter speed value, and a section d12 numerically displays an exposure adjustment value and an aperture value. In the middle area, a section d20 displays a focus control mode and sections d9, d10 and d11 display an exposure control mode and so on. In the lower area, sections d4, d5 and d6 display the drive mode and sections d7 and d8 display the focus detection area. In this particular condition of FIG. 4A, the section d13 in the middle area displays a character 'P' denoting the Programmed exposure control mode which is normally the most frequently used mode. The viewfinder display 4b provided inside the viewfinder is used for displaying mainly a shutter speed value and an aperture value.

Figure 4A:
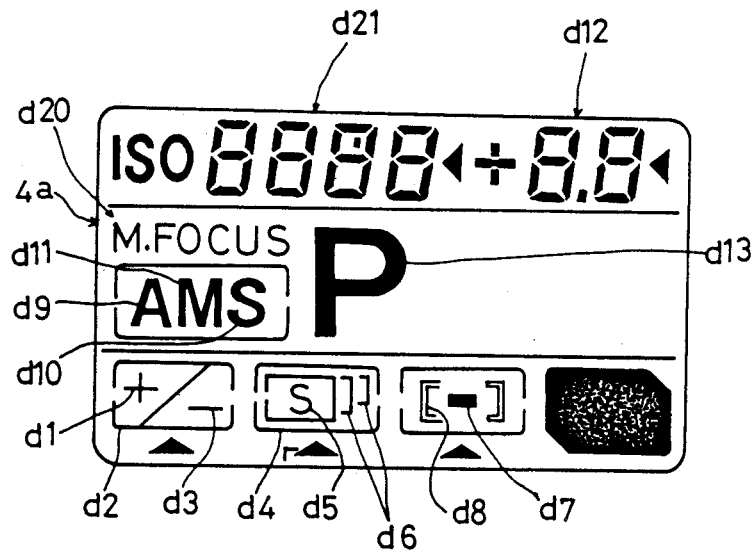
Figure 4B:
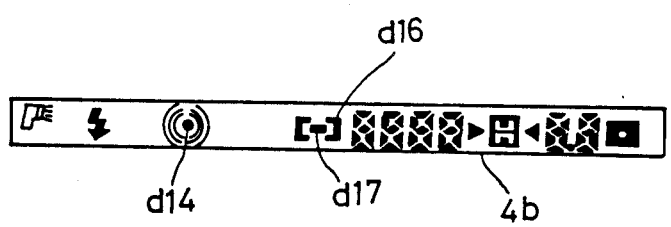

As may be apparent from FIG. 4A, the section d13 is located substantially centrally of the display panel 4a and is about twice as large in both length and width than the other sections d9, d10, d11, etc.

Figure 5A:
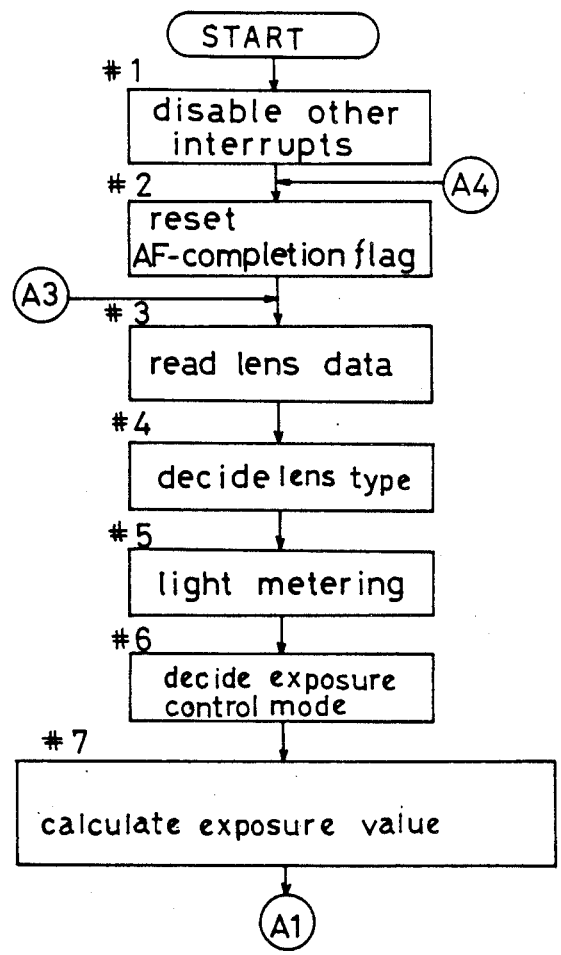
FIGS. 5A, 5B and 5C are a flow chart illustrating a main control routine.
Figure 5B:
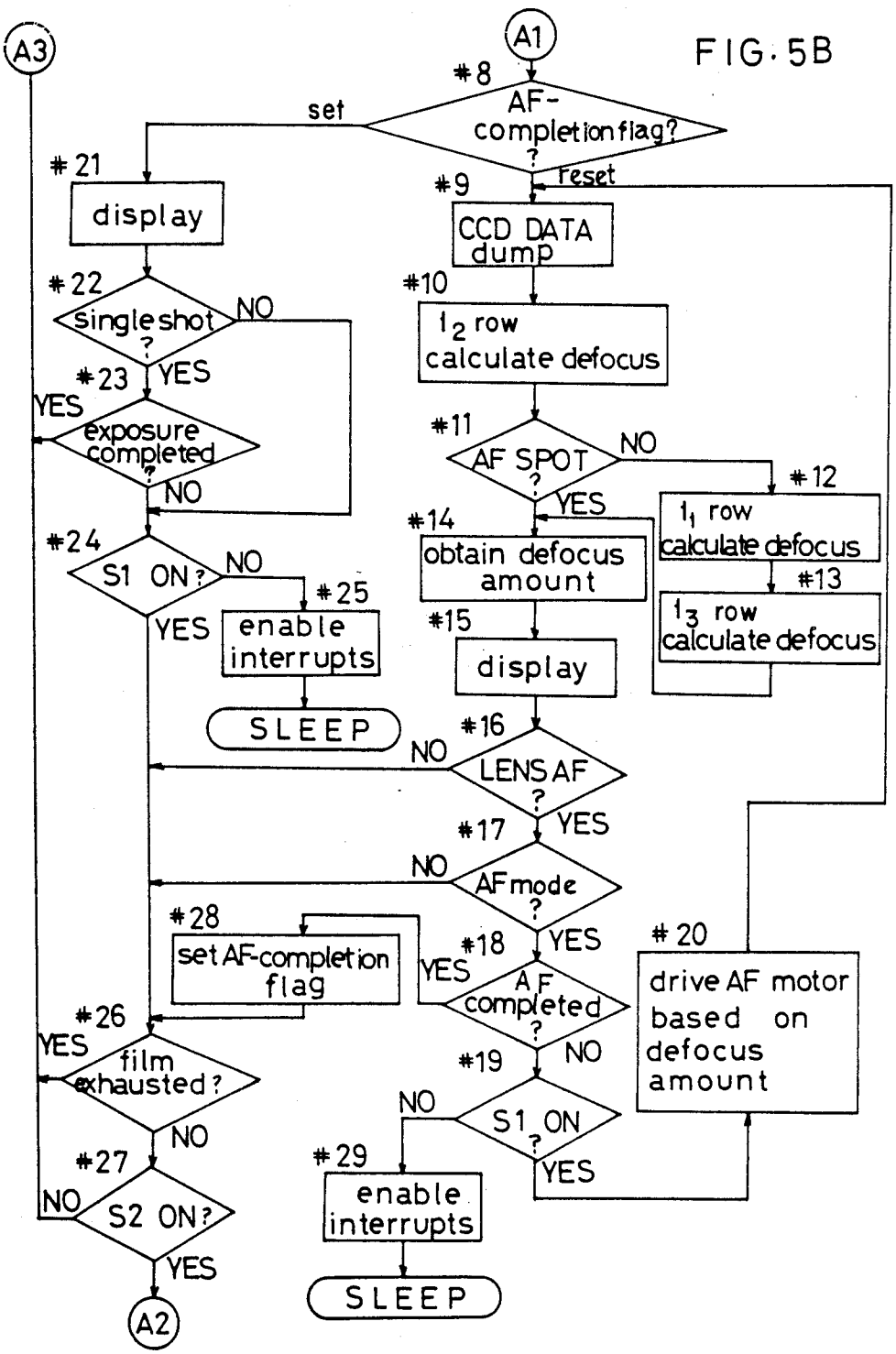
Figure 5C:
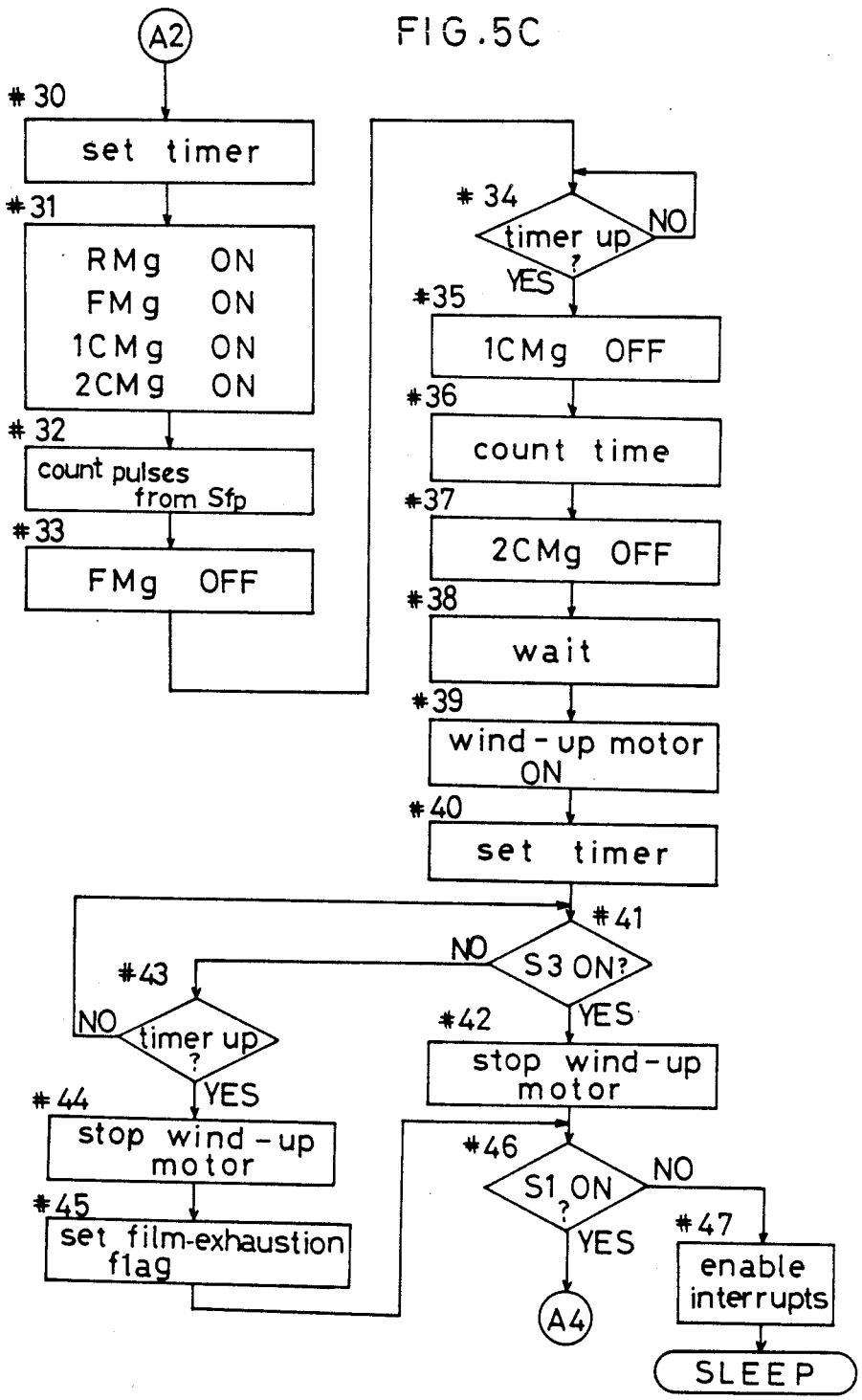

The microprocessor 1 is pre-programmed to execute the control operation illustrated in a flow chart of FIGS. 5A, 5B and 5C. This control operation will be particularly described next with reference to the flow chart.

Upon start of the main routine of the program in response to the operation of the shutter release button 9 i.e. the ON state of the switch S1, all interrupts are disabled at step #1. At step #2, the program resets an AF-completion flag which shows completion of autofocus operation. At subsequent steps #3 through #7, the program reads the lens data, decides therefrom whether the currently mounted lens can be used for auto focus mode (hereinafter, such a lens is referred to as the autofocus lens) or not, effects a light metering, decides the set exposure control mode and then calculates exposure values such as the shutter speed and the aperture value based on the results of the above and also on a film speed value ISO, an exposure adjustment value CO described later and others.

At step #8, the program decides whether the AF completion flag is set or rest. If the AF-completion flag is reset, that is, the auto focus operation is not completed, the program controls the focus sensor 5 to accumulate incident light on the rows I through III at step #9 and calculates a defocus amount based on the output data of the row $I_2$ at step #10. Subsequently, the judgement of the focus detection area is performed at step #11. If the wide area is selected as the focus detection area, defocus amounts corresponding to the rows I and III are calculated at steps #12 and #13. On the other hand, if the spot area is selected, as the defocus amount for driving the autofocus motor AFM, the defocus amount calculated at step #10 is adopted at step #14. In case of the wide area, one of the defocus amounts, which corresponds to the nearest object distance, is adoped as the defocus amount for driving the autofocus motor AFM at step #14. Then, at step #15, data relating to the calculated exposure value and the focus condition are displayed on the display panel or the viewfinder display.

Next, at steps #16 through #20, if the lens is the autofocus lens and the autofocus mode is selected and further if the adopted defocus amount is not within range of the in-focus condition and the switch S1 remains ON, the autofocus motor AFM is driven for focusing based on the adopted defocus amount.

Contrarily, if it is decided that the AF-completion flag is set, that is, the auto focus operation is completed, the program moves to step #21. At steps #21 through #25, it is diplayed that the auto focus operation is completed, and the program judges the drive mode. In the case of the one-frame shot mode, the program checkes the state of the switch S1 only when the exposure operation has not taken place after the start of this routine. And, if the switch S1 is judged as OFF, the program enables interrupts and moves to SLEEP.

On the other hand, with true condition of ON state of the switch S1 at step #24, after checking presence of remaining film at step #26, the program checks the state of the switch S2 at step #27. Then, if the switch S2 is ON, the program advances to step #30 shown in FIG. 5C.

Incidentally, if the program determines that the adopted defocus amount is within range of the in-focus condition at step #18, the AF-completion flag is set at step #28. Also, if the program determines OFF state of the switch S1 at step #19, interrupts are enabled at step #29 to move to SLEEP. Further, with true condition of completion of the exposure operation at step #23, or with true condition of film exahustion (end of roll) at step #26, or with false condition of ON state of the switch S2 at step #27, the program returns to step #3. Also, if the lens is determined as not the autofocus lens at step #16, or if release of the automatic focusing mode is determined at step #17, the program branches to step #26.

Further, if the condition of ON state of the switch S2 is true at step #27, a timer is started at step #30 as shown in FIG. 5C. At step #31, the release magnet RMg is energized for an aperture closing operation and mirror-up operation, the shutter control magnet pair 1CMg and 2CMg are energized as preparation for the shutter release operation, and the aperture stop magnet FMg is energized as preparation for stopping the aperture. At step #32, the program counts pulse signals (aperture operation detection signals) from the switch Sfp and waits for the count value to reach a predetermined value. When the count value has reached said value, the aperture stop magnet FMg is deenergized for stopping the aperture closing operation at step #33.

Next, at step #34, the program checks the status of the timer set at step #30. If the timer's time is up, the magnet 1CMg is deenergized for driving the first curtain of the shutter at step #35. Then, after waiting for a predetermined period corresponding to an exposure period (shutter speed) at step #36, the magnet 2CMg is deenergized for driving the second curtain of the shutter at step #37. Further, after waiting for a predetermined period at step #38, the film windup motor WM is energized for advancing the film by one frame at step #39 and the timer is started at step #40.

At step #41, the program judges completion of film advance by checking the state of switch S3. If the condition is true because of ON state of the switch S3, the wind-up motor WM is stopped at step #42. If the step #41 condition is false because of OFF state of the switch S3, the program interprets this as the film exhaustion and waits for time of the timer to be up at step #43, and when the time is up, the wind-up motor WM is stopped at step #44 and a film-exhaustion flag is set at step #45.

When the above-described operations are all completed, the program checks at step #46 the state of the switch S1. If the switch S1 is OFF, the program enables interrupts and moves to SLEEP. If the switch S1 is ON, on the other hand, the program returns to step #2 in the flow of FIG. 5A to repeat the above operations.

Figure 6A:
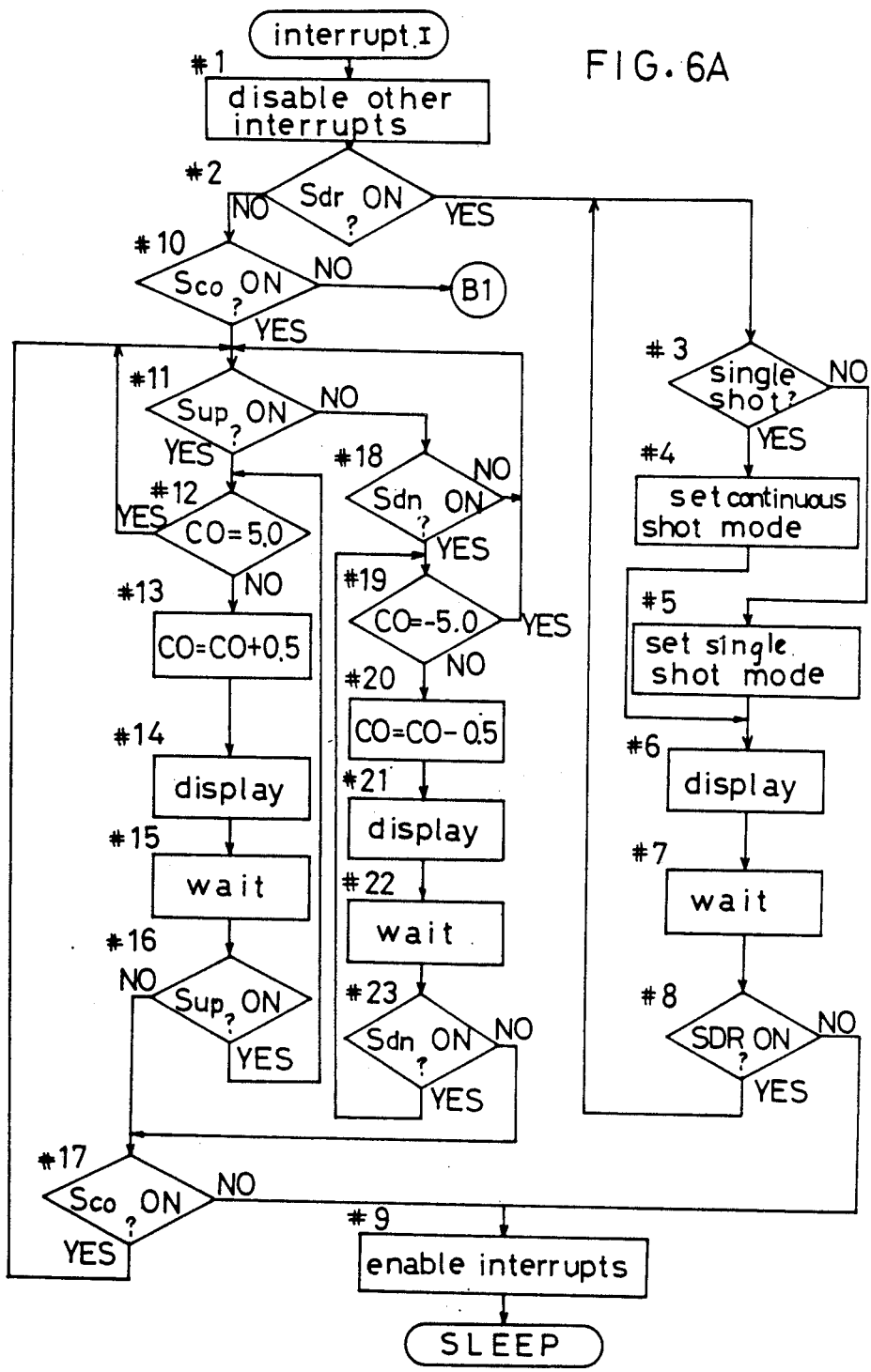
FIGS. 6A and 6B are a flow chart of an interrupt processing routine.
Figure 6B:
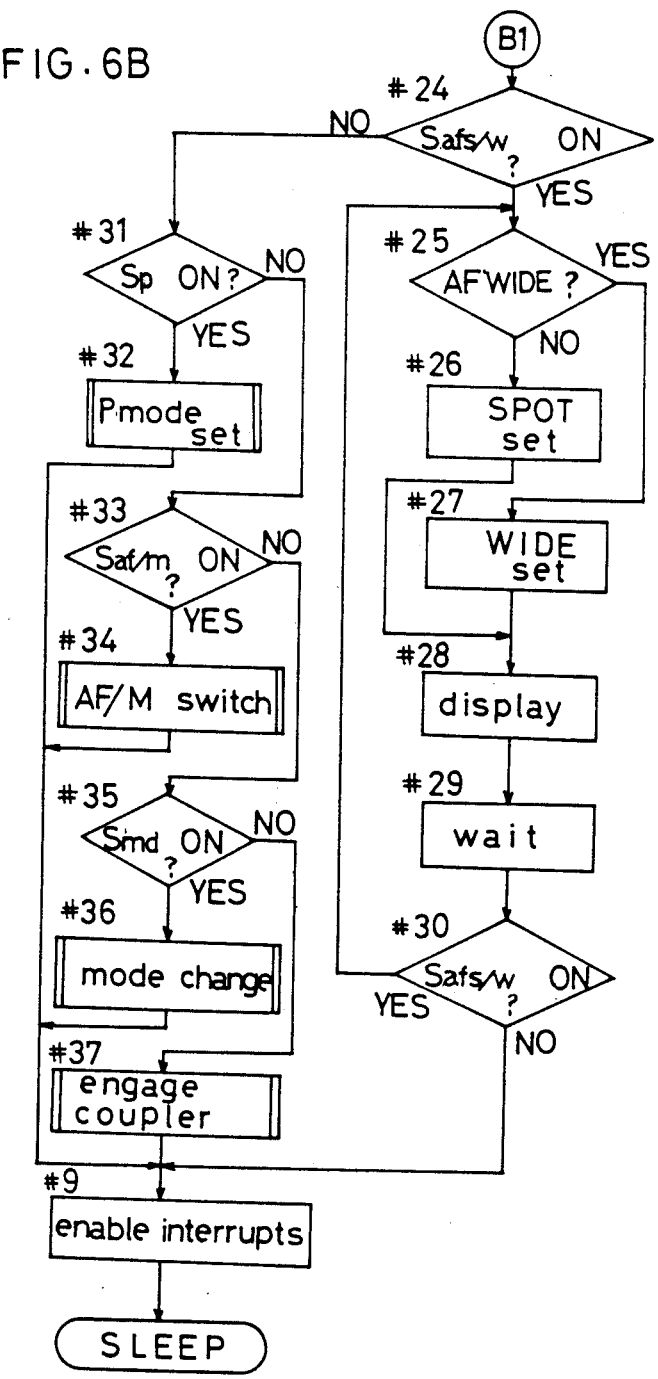

FIGS. 6A and 6B illustrates an example of interrupt control operation occurred by the switches. In this interrupt control operation, the program disables all the other interrupts at step #1. At step #2, the program checks ON state of the drive mode switch Sdr. If true, then the program judges the set drive mode at step #3. If the set drive mode is the one-frame shot mode, the continuous shot mode is newly set as the drive mode at step #4. If the continous shot mode, on the other hand, the one-frame shot mode is newly set at step #5. Therefore, the drive mode is changed every depression of the drive mode switch Sdr. And, the either set drive mode is displayed on the display panel 4a at step #6. More particularly, the section d4 and d5 of the display panel 4a are illuminated for the one-frame shot mode, whereas the sections d4 and d6 are illuminated for the continuous shot mode. After waiting for a predetermined period at step #7, the program advances to step #8 to check ON state of the drive mode switch Sdr. If true, the program returns to step #3 to change the drive mode again. Else, the program enables interrupts at step 9 and moves to SLEEP.

On the other hand, if the drive mode switch Sdr is OFF at step #2, the program advances to step #10 to check the state of the exposure adjusting switch Sco. If the exposure adjusting switch Sco is ON, the program determines which switches, the up switch Sup or the down switch Sdn operated by the UP/DOWN knob 13, is ON at steps #11 and #18 to execute the exposure adjustment. More particularly, at steps #11 through #14, with an ON operation of the switch Sup, if the adjustment value CO is not equal to +5.0 EV, the adjustment value CO is added with 0.5 EV in APEX system and the adjustment value Co is displayed at the section d12 of the display panel 4a. At steps #15 and #16, after waiting a predetermined period, if the switch Sup is still judged as in ON state, a readjustment operation is effected. On the other hand, if the switch Sup is judged as in OFF state at step #16, the program checks the state of the switch Sco at step #17. If the down switch Sdn is determined as ON and the adjustment value CO is not equal to −5.0 EV, the program adds a value −0.5 EV to the adjustment value CO, and the value CO is displayed at the section d12 of the display panel 4a. At steps #22 and #23, if the switch Sdn is still ON after waiting a predetermined period, the program continues the adjustment by adding −0.5 EV to the adjustment value CO. Else, i.e. if the down switch Sdn is OFF at step #23, the program goes to step #17 to check ON state of the switch Sco. If true, the program returns to step #11 to repeats the above-described exposure value adjustment control. If false, on the other hand, the program branches to step #9 to move to SLEEP. Incidentally, the adjustment value CO is so set as included in the range between −0.5 EV to +0.5 EV.

Also, if the switch Sco is determined as OFF at step #10, the program advances to step #24, as illustrated in FIG. 6B, to check the state of the focus detection area select switch Saf s/w. With ON condition of this switch Saf s/w, at step #24, the program sets the focus detection area to either the spot are or to the wide area and then displays the same on the display panel 4a and the viewfinder display 4b. That is, the section d7 and d17 are illuminated in the case of the spot area while the sections d8 and d16 are illuminated in the case of the wide area at steps #25 through #28. At steps #29 and #30, the condition of the switch Saf s/w is checked, and if the same is detected as ON, the program again effects a setting i.e. focus detection area change operation. On the other hand, with OFF condition of the switch Saf s/w, the program proceeds to step #9 to move to SLEEP.

Then, if the switch Saf s/w is OFF at step #24, the program advances to step #31 to check ON state of the program switch Sp. If true, the program switches over the exposure control mode to the programmed exposure control mode at step #32 in accordance with the P mode set subroutine described later. If false, on the other hand, the program jumps to step #33 to check ON state of the focusing mode select switch Saf/m. If true at step #33, the program switches over at step #34 the focusing mode either to the autofocus mode or to the manual focusing mode. If false at step #33, on the other hand, the program jumps to step #35 to check ON state of the mode switch Smd. If true at step #35, the program executes at step #36 an exposure control mode change operation based on the mode change subroutine described later. If false at step #35, on the other hand, the program jumps to step #37 to execute control for projecting the coupler 107 into operative engagement with the focusing system of the lens.

Figure 7:
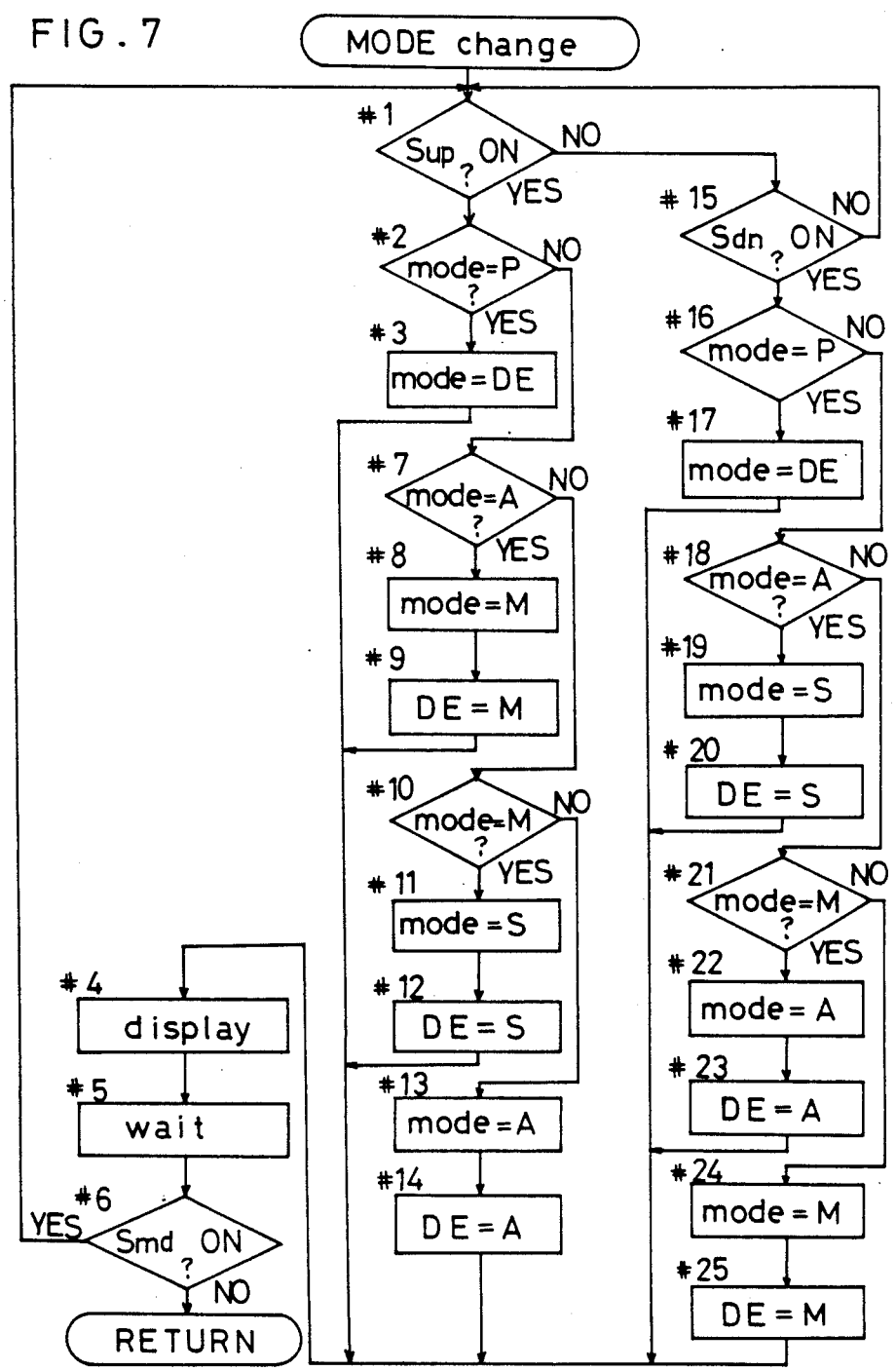
FIG. 7 is a flow chart of a subroutine for an exposure control mode switchover.

Next, the subroutine executed at step #36 will be particularly described with reference to a flow of FIG. 7.

With start of this subroutine, at step #1 the program checks ON state of the up switch Sup. If true, then at step #2 the program decides whether the current exposure control mode is the programmed exposure control mode (P mode) or not. If true again, the program releases this P mode and sets the previous exposure control mode set prior to the P mode and this mode is displayed for a predetermined period by illumination of either of the display sections d9, d10 and d11 at steps #4 and #5. Then, at step #6, the program checks ON state of the mode switch Smd. If true, the program goes back to step #1 to continue the exposure control mode change operation. If the current mode is not the P mode at step #2, the exposure mode is set to the manual exposure control mode (M mode) if the current mode is the aperture-priority mode (A mode), or to the shutter-priority mode (S mode) if the current mode is the M mode, or to the A mode if the current mode is the S mode at steps #7 through #14.

Conversely, if the switch Sup is OFF at step #1 and the down switch is ON at step #15, and if it is judged at step #16 that the current mode is the P mode, the program releases this mode and sets at step #17 the previous exposure control mode set prior to the P mode in accordance with the contents of a registor DE. Then, the program proceeds to step #4 to temporarily display this mode by one of the display sections d9, 10 and d11, waits for a predetermined period at step #5 and then checks ON state of the switch Smd at step #6. If true, the program goes back to step #1 to continue the mode change operation. If the current mode is not the P mode at step #16, on the other hand, the exposure mode is set to S mode if the current mode is the A mode, or to the A mode if the current mode is the M mode, or to the M mode if the current mode is the S mode at steps #16 through #25.

Incidentally, in the above-described exposure mode change operation by using the switches Smd, Sup and Sdn, the programmed exposure control mode is never set. In addition to, the mode set in the mode change operation is stored in the registor DE.

Next, the subroutine called at steps #32, #34 and #37 of FIG. 6B will be particularly described with reference to FIGS. 8A and 8B. In this subroutine, with an ON operation of the P mode switch Sp, the exposure mode is switched over to the programmed expsoure control mode as of whatever mode the current mode is, and if the current focusing mode is the manual focusing mode, this manual focusing mode is switched over to the autofocus mode. Also, the coupler 107 is rotatably driven to project into engagement with the focusing system of the lens. This coupler-engagement control routine is executed also when the focusing mode is switched over to the autofocus mode by the focusing mode select switch Saf/m and further when the lens is mounted to the camera body.

Figure 8A:
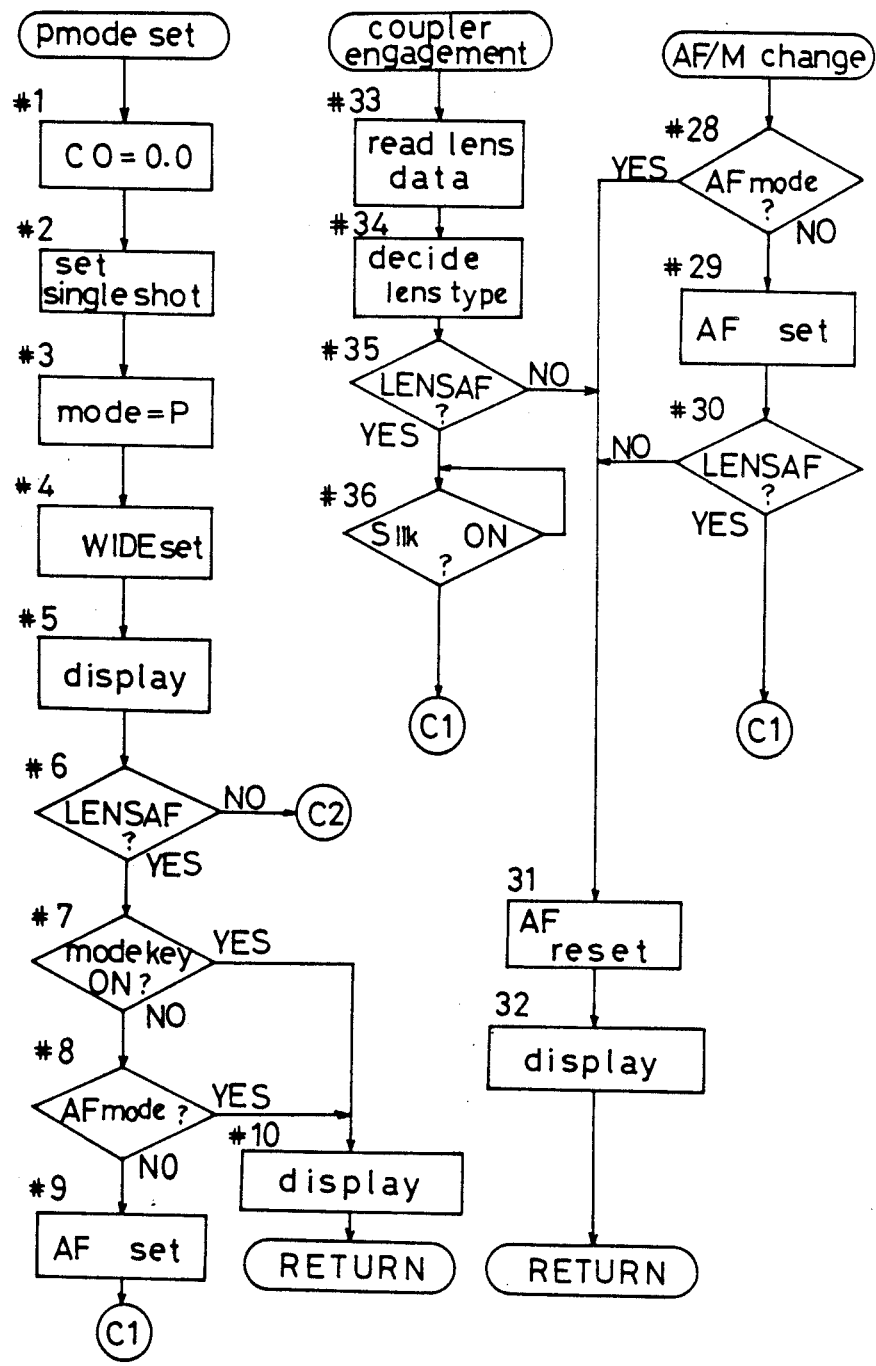
FIGS. 8A and 8B are a flow chart of a subroutine of an engagement between a coupler provided on the camera and a focusing system of a mounted lens and so on, FIG. 9 is a flow chart illustrating a control routine executed with a setting of battery.

That is to say, as shown at steps #31 and #32 of FIG. 6B, with an ON operation of the switch Sp, as shown at steps #1 through #4 in FIG. 8A, the exposure adjustment value CO is reset at 'O', the drive mode is set at the one-frame shot mode, the exposure control mode is set at the programmed exposure control mode and the focus detection area is set at the wide area, and these conditions are displayed by illumination of sections d13, d4, d5 and d8 of the display panel 4a at step #5. Further, if it is determined at step #6 that the mounted lens can be used for the autofocus mode, and if it is judged at step #8 that the autofocus mode is not yet set, then the program sets the autofocus mode as the focusing mode at step #9. On the other hand, if it is judged at step #7 that the mode switch Smd is in ON state, the program jumps to step #10 without processing at steps #8 and #9 and then returns to the main routine.

Figure 8B:
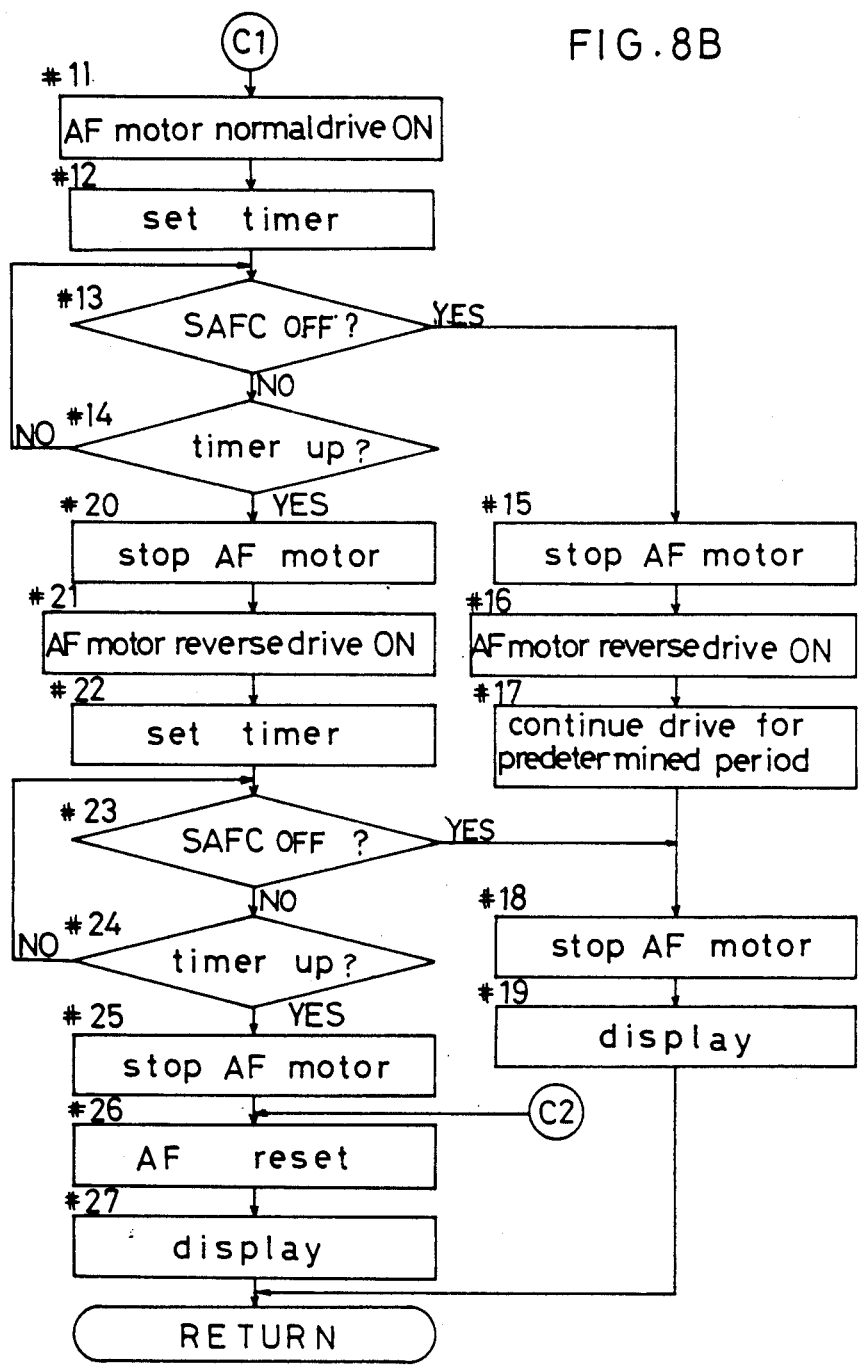

Subsequent to the setting of autofocus mode at step #9, as illustrated in FIG. 8B, the program advances to step #11 to start rotation of the autofocus motor AFM in the normal direction and waits for a predetermined period at steps #12 through #14. During the predetermined period at step #13, the program decides completion of the engagement between the coupler 107 and the focusing system of the lens by checking OFF state of the engagement check switch Safc. If the OFF state of the switch Safc is detected withtin the predetermined period at step #13, the autofocus motor AFM is stopped at step #15, and then at steps #16 and #17 the motor is rotated in the reverse direction for a predetermined period for locking the engagement. At steps #18 and #19, the motor is stopped and the completion of coupler engagement is displayed at the display panel 4a by disilluminating the section d20.

Conversely, if at steps #13 and #14 the program does not detect engagement of the coupler 107 within the predetermined period, the autofocus motor AFM is temporarily stopped at step #20 and the engagement between the coupler 107 and the focusing system of the lens is attempted again at steps #21 through #24 by rotating the motor AFM in reverse direction. With this second attempt, if the coupler engagement is detected at step #23, the program executes the actions at steps #18 and #19. Whereas if the program again fails to detect the coupler engagement, the autofocus motor AFM is stopped at step #25, the autofocus mode is released to set the manual focus mode at step #26 and this mode release operation is displayed at the display panel 4a by illuminating the section d20 at step #27. Thereafter, the program returns to the main routine.

Similarly, as illustrated in FIG. 8A, if it is judged at step #28 that the current focusing mode is the manual focus mode, the autofocus mode is set at step #29. Then, if the program judges at step #30 that the lens can be used for the automfocus mode, the program branches to step #11 to execute the control routine for the coupler engagement. On the other hand, if it is judged at step #28 that the autofocus mode is set, or if it is judged at step #30 that the lens can not be used for the autofocus mode, the autofocus mode is released to set the manual focus mode at step #31 and this condition is displayed at step #32 at the display panel 4a by illumination of the section d20.

Further, with the mounting of the lens to the camera body 3, at step #33 the program reads the data of the mounted lens and determines at steps #34 and #35 whether the lens can be used for the autofocus mode or not. If true, the program checks at step #36 the locked condition of the lens by checking whether the lock switch S11k is in ON state or not. If true, the program goes to step #11 to execute the aforedescribed routine for the engagement of the coupler 107. On the other hand, if it is decided at step #35 that the lens can not be used for the autofocus mode, the program goes to step #31 and then #32 for releasing the autofocus mode and displaying the same.

Figure 9:
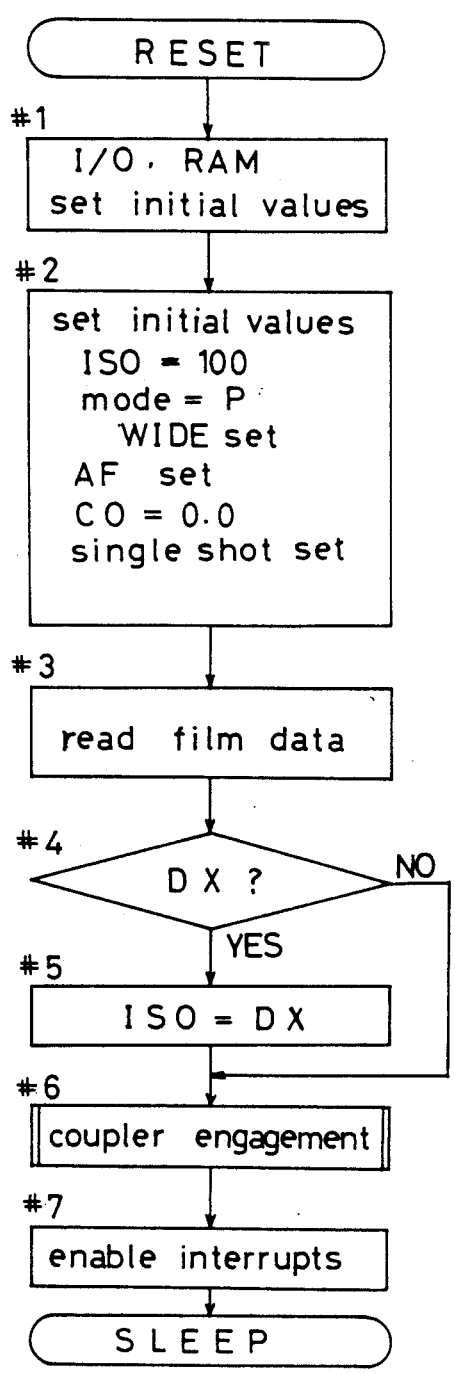

The photographic camera of this embodiment uses a battery for executing the above-described various control operations. Next, a control routine executed with a loading of the battery will be described with reference to FIG. 9. As shown, in this routine, with a loading of the battery, the program executes initialization of the input/output terminals and the contents of RAM at step #1. Then at step #2, the program assigns various initial values; namely, the film speed to ISO=100, exposure control mode to the programmed exposure control mode, the focus detection area to the wide area, the focusing mode to the autofocus mode, the exposure adjustment value CO to 'O' and the drive mode to the one-frame shot mode. At step #4, the program reads film speed data from the film speed sensor FS and at step #5 decides presence of the DX code on the cartridge of the loaded film. If true, the program assigns this detected value from the DX code to the film speed at step #5. At step #6, the program executes the coupler engagement subroutine illustrated in FIGS. 8A and 8B and then enables interrupts at step #7 and moves to SLEEP.

In the above-described control operation illustrated in FIGS. 8A and 8B of the present embodiment of the invention, the forcible mode switchover unit is represented by step #9 (FIG. 8A). That is, if the programmed exposure control mode is selected with an ON operation of the P mode switch Sp, the focusing mode is automatically switched over to the autofocus mode. Consequently, the programmed exposure control mode and the autofocus mode may be designated at the same time.

Next, the mechanism for the autofocus operations will be described.

Incidentally, a photographic camera in which the present invention is to be embodied is capable of detecting focus condition by using a light reflected from an object to be photographed and travelling through a photographic lens. And, this photographic lens is usable in an autofocus mode in which the lens is driven by a motor based on the detected condition and in a manual focus mode in which the lens is manually driven.

Figure 14:
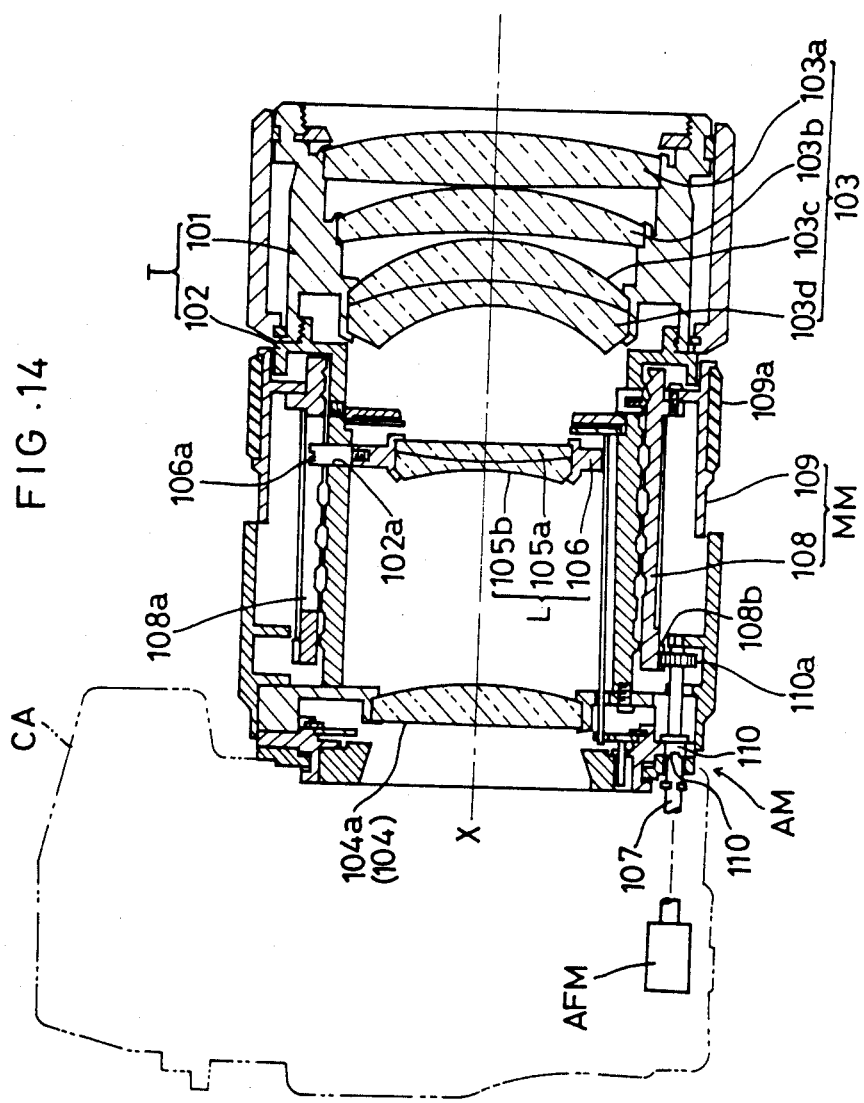
FIG. 14 is a side view in vertical section of the lens.

As shown in FIG. 14, a lens barrel T includes a front lens barrel portion 101 and a rear lens barrel portion 102 operatively connected with each other. The front lens barrel portion 101 fixedly mounts therein a front lens unit 103 having four lenses 103a, 103b, 103c and 103d, while the rear lens barrel portion 102 fixedly mountes therein a rear lens unit 104 having a lens 104a. Further, in the rear lens barrel portion 102 between the front lens unit 103 and the rear lens unit 104, there is a movable lens L movable along an optical axis X.

The movable lens L includes a pair of lenses 105a and 105b, and is held by a lens holder 106. At an outer peripheral edge of the lens holder 106, there are fixedly screwed three guide pins 106a which are inserted respectively into three cam grooves 102a defined in the peripheral face of the rear lens barrel portion 102 to be engaged with three straight grooves 108a defined along the optical axis X in the peripheral face of a straight ring 108 rotatably supported about the rear lens barrel portion 102.

One side of the straight ring 108, an operational ring 109 is screwed to be movable together with the annular ring 108, with the operational ring 109 carrying thereon a rubber ring 109a with a rugged outer peripheral surface. In a manual focusing operation, when the operational ring 109 is manually rotated, the movable lens L rotates therewith and moves along the optical axis X as being guided by the cam grooves 102a and the straight grooves 108a. The above-described straight ring 108 and the operational ring 109 together constitute a manual focusing mechanism MM.

Figure 10:
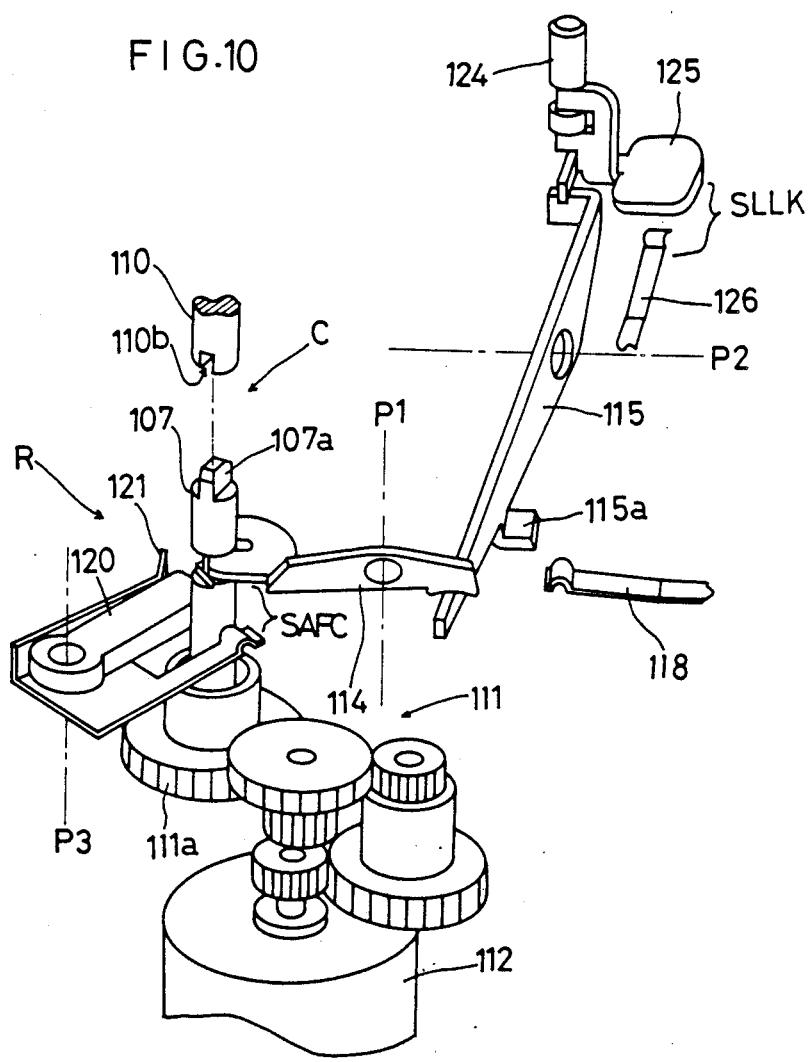
FIG. 10 is a perspective view a coupler engaging system.

Next, an automatic focusing mechansim AM will be described. As shown in FIGS. 10, 11 and 14, the straight ring 108 defines at a rear end of its outer periphery a gear portion 108b which meshes with a coupler gear 110a of an AF coupler 110. On the other hand, a camera body CA mounts the autofocus motor AFM operatively connected with a drive gear 111a via a gear train 111. The drive gear 111a is fitted on a drive shaft coupler 107 having a projection 107a at a leading end thereof, with the gear 111a and the shaft 107 being coaxially slidable and rotatable in unison together with. Also, as shown in FIG. 12, the drive shaft 107 is urged towards its projection side by means of a spring as engaging-direction urging means 113.

In operation of above-described construction, the drive shaft 107 is urged to allow its projection 107a to be engaged into a recess 110b of the AF coupler 110 and the motor AFM rotates the straight ring 108, whereby an automatic focusing operation is carried out.

Further, the drive shaft 107 is so positioned as viewed from the front of the camera body CA illustrated in FIG. 2.

Figure 11A:
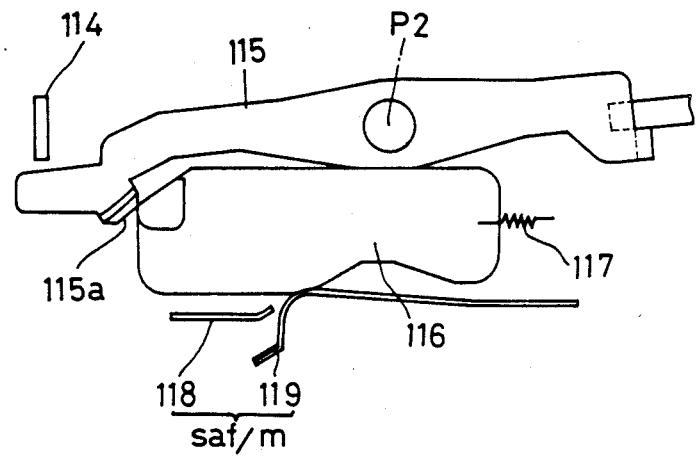
FIGS. 11A and 11B are side views showing an operational arm shown in FIG. 10 and its vicinity.
Figure 11B:
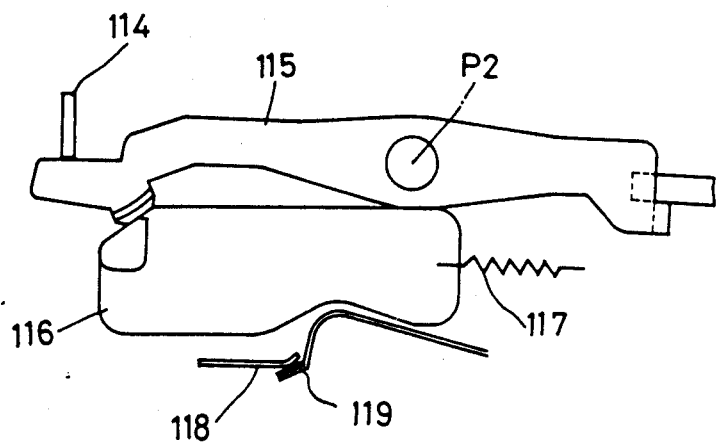
Figure 12:
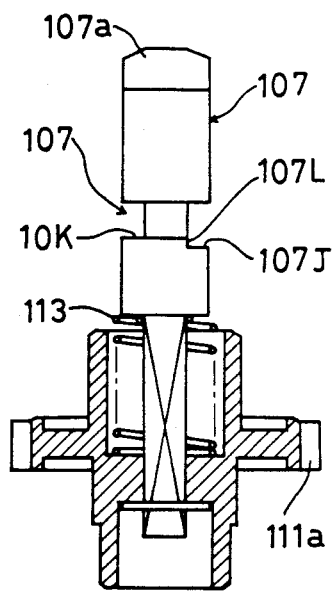
FIG. 12 is a section view showing the coupler and its vicinity.

As shown in FIGS. 10 and 12, between the drive shaft 107 and the AF coupler 110, there is provided a clutch C. The clutch C is normally engaged by means of the spring 113. For operating this clutch C into disengagement (i.e. for a switchover to the manual focus mode), as shown in FIGS. 10, 11 and 12, an end of a first arm 114 pivotable about an axis P1 is engaged on the drive shaft 107 across a recess 107b defined therein, and an end of a second arm 115 pivotable about an axis P2 is placed in abutment against the other end of the first arm 114.

Fruther, as shown in FIG. 11A, there is provided an operational member 116 slidable to the right and left in the drawing by means of an unillustrated external operating portion along the second arm 115, with the operational member 116 being pulled away from a projection 115a of the second arm 115 by an urging force of a spring 117. Then, with an operation of the selector knob 11 shown in FIG. 2, the operational member 116 is slided leftwards in FIG. 11B to come into abutment against the projection 115a of the second arm 115, and the second arm 115 is pivoted clockwise about the axis P2. Accordingly, the first arm 114 placed in abutment against the one end of the second arm 115 is rotated counterclockwise about the axis P1, then, through the engagement between the other end of the first arm 114 and the drive shaft 107, the drive shaft 17 is slided away from the AF coupler 110.

With the above sliding operation of the operational member 116, a switch plate 118 comes into contact with a terminal 119 thereby turning ON the switch Saf/m, which signal is inputted to the control device. This signal means switch over of the focus mode from the autofocus mode to the manual focus mode, and then the operational member 116 returns to its home position by the urging force of the spring 117.

Next, there will be described a locking mechanism R for locking the drive shaft 107 at the position away from the AF coupler 110. As shown in FIG. 10, an engaging arm 120 is supported pivotable about an axis P3, with the arm 120 being urged towards the drive shaft 107 by means of a plate spring 121. On the other hand, as shown in FIG. 12, the drive shaft 107 has the recess 107b forming at different levels thereof a first face 107K and a second face 107J.

In operation, when the drive shaft 107 is operated away from the AF coupler 110, the engaging arm 120 engages into the recess 107b thereby locking the drive shaft 107 at this position.

The motor AFM is deenergized in the above condition (manual focus mode). However, if the operational member 116 is again slided to bring the switch plate 118 into contact with the terminal 119 to generate a signal to the control device, or if the program set button 12 shown in FIG. 1 is manually depressed to generate a signal to the control device, the focus mode is switched over to the autofocus mode from the manual focus mode.

Figure 13A:
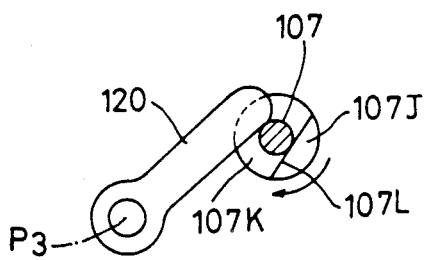
FIGS. 13A, 13B and 13C are views showing the partial movement of the coupler engaging system.
Figure 13B:
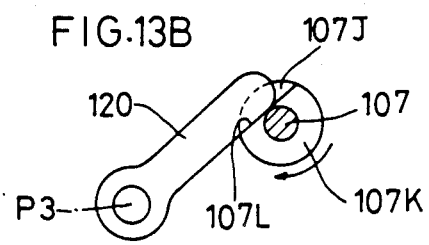
Figure 13C:
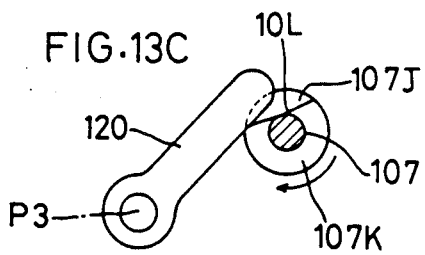

More particularly, with the press-down operation of the shutter release button 9 of FIGS. 1 and 2, the focus detecting unit detects focus condition of the lens, and the motor AFM is driven in accordance with the focus condition obtained by the focus detecting unit, whereby the drive shaft 107 is rotated. Then, supposing the engaging arm 120 is currently placed on the first face 107K of the drive shaft 107, as shown in FIG. 13A, the clockwise rotation of the drive shaft 107 moves the engaging arm 120 from the first face 107K to the second face 107J, as shown in FIG. 13B, and the drive shaft 107 is projected towards the AF coupler 110 by an amount equivalent to the level difference between the first and second faces 107K and 107J. With a further rotation of the drive shaft 107, as illustrated in FIG. 13C, one edge of a side face 107L bridging between the first face 107K and the second face 107J outwardly pushes the engaging arm 120 off the second face 107J, whereby the drive shaft 107 is projected by the spring 113 to come into engagement with the AF coupler 110. The above-described first face 107K, second face 107J and the side face 107L of the drive shaft 107 together constitute 5 release mechanism for the locking mechanism R.

Further, as shown in FIG. 10, the second arm 115 carries at the other end thereof a lock pin 124 for locking engagement between the lens and the camera body CA and a lens lock button 125 for releasing the locked condition of the lock pin 124. In operation, if the lens lock button 125 is manually depressed to cause the pin 124 to release the locked condition, the second arm 115 is pivoted to move the drive shaft 107 away from the AF coupler 110 and the drive shaft is locked by the engaging arm 120, and this operation is detected by the switch S11k.

Incidentally, the lock pin 124 is normally urged to project forwardly from the lens mount 14 shown in FIG. 2. When the lens is mounted on the camera body, the pin 124 first recedes therefrom by being pushed by the lens and then projects to engage into the recess of the lens with complete engagement between the camera body and the lens. Thereby, the switch S11k is turned ON at the initial state of the lens mount operation and turned OFF with the completion of the operation.

In the above-described embodiment, the forcible mode switchover unit comprises a program, i.e. software. In place of this, the same may comprise a hardware constituted by logic gates and so on.

What is claimed is:

1. A photographic camera comprising:
   focus condition detection means for detecting focus conduction of a photographic lens relative to a photographic subject;
   exposure control means capable of selectively providing a plurality of exposure control modes;
   exposure mode selecting means for selecting an exposure control mode from the plurality of exposure control modes;
   focus control means for selectively providing an autofocus mode where focusing is effected automatically based on the focus condition detected by the focus condition detection means and a manual focus mode where a focusing is effected manually;
   focus mode selecting means for switching over between the autofocus mode and the manual focus mode; and
   switching means for switching said focus control means to the autofocus mode in response to a predetermined exposure mode selecting operation by said exposure mode selecting means when the manual focus mode is currently selected.

2. A photographic camera as defined in claim 1, further comprising:
   lens driving means for driving the photographic lens based on the focus condition detected by the focus condition detection means; and
   transmission means capable of selectively providing a transmission condition where the drive of said driving means is transmitted to the photographic lens and a non-transmission condition where said transmission of drive is broken;
   wherein said transmission means provides the transmission condition in the autofocus mode and provides the non-transmission condition in the manual focus mode, respectively.

3. A photographic camera comprising:
   light metering means for metering brightness of a photographic subject;
   focus condition detection means for detecting focus condition of a photographic lens relative to the photographic subject;
   exposure control means capable of selectively providing a programmed exposure mode where values including an aperture value and a shutter speed are automatically set based on a detection of said light metering means and in accordance with a predetermined program and a manual exposure mode where at least one of either the aperture value and the shutter speed is manually set;
   focus control means for selectively providing an autofocus mode where a focusing is effected automatically based on the focus condition detected by the focus condition detection means and a manual focus mode where a focusing is effected manually;
   first switching means for switching over between the autofocus mode and the manual focus mode; and
   second switching means for forcibly switching said focus control means to the autofocus mode in response to an exposure mode switching operation by said first switching means from the manual exposure mode to the programmed exposure mode when the manual focus mode is currently selected.

4. A photographic camera as defined in claim 3, further comprising:
   lens driving means for driving the photographic lens based on the focus condition detected by the focus condition detection means; and
   transmission means capable of selectively providing a transmission condition where the drive of said driving means is transmitted to the photographic lens and a non-transmission condition where said transmission of drive is broken;
   wherein said transmission means provides the transmission condition in the autofocus mode and provides the non-transmission condition in the manual focus mode, respectively.

5. A photographic camera having an autofocus mode in which focusing is effected automatically based on a detected focus condition and a manual focus mode in which a focusing is effected manually, the camera comprising:
   a camera body;
   a photographic lens detachably attached to said camera body;
   manual operating means for switching over the focus modes;
   lens-attachment detecting means for detecting attachment of said photographic lens to the camera body; and
   forcible switching means, when the manual focus mode is currently selected, for forcibly switching the focus mode to the autofocus mode in response to a lens attachment detection effected by said detecting means while overriding said manual operating means and for allowing thereafter a mode switchover by said manual operating means.

6. A photographic camera as defined in claim 5, further comprising:
   lens driving means for driving the photographic lens based on the detected focus condition detected by the focus conditon detection means; and
   transmission means capable of selectively providing a transmission condition where the drive of said driving means is transmitted to the photographic lens and a non-transmission condition where said transmission of drive is broken;

wherein said transmission means provides the transmission condition in the autofocus mode and provides the non-transmission condition in the manual focus mode, respectively.

7. A photographic camera having an autofocus mode in which a focusing is effected automatically based on a detected focus condition and a manual focus mode in which a focusing is effected manually, the camera comprising:

lens driving means for driving a photographic lens;

a clutch provided between said driving means and the photographic lens;

manual operating means for switching over the focus modes between the autofocus mode where said clutch is engaged and the manual focus mode where said clutch is disengaged; and forcible switching means for, when the manual focus mode is currently selected, forcibly switching the focus mode to the autofocus mode in response to power ON of the camera and for allowing thereafter a mode switchover by said manual operating means.

8. A photographic camera having an autofocus mode in which a focusing is effected automatically based on a detected focus condition and a manual focus mode in which a focusing is effected manually, the camera comprising:

a camera body;

a photographic lens detachably attached to said camera body;

manual operating means for switching over the focus modes;

lens-attachment detecting means for detecting attachment of said photographic lens to the camera body; and forcible switching means for forcibly switching the focus mode to the autofocus mode in response to a lens attachment detection effected by said detecting means when the manual focus mode is currently selected.

9. A photographic camera as defined in claim 8, further comprising:

lens driving means for driving the photographic lens based on the detected focus conditon detected by the focus condition detecting means; and transmission means capable of selectively providing a transmission condition where the drive of said driving means is transmitted to the photographic lens and a non-transmission condition where said transmission of drive is broken;

wherein said transmission means provides the transmission condition in the autofocus mode and provides the non-transmission condition in the manual focus mode, respectively.

* * * * *